United States Patent [19]

Sebillotte

[11] 4,370,999

[45] Feb. 1, 1983

[54] PRESSURE LIMITING DEVICE WITH TWO PRESSURE LEVELS FOR A PRESSURE COOKER

[75] Inventor: Christian Sebillotte, Selongey, France

[73] Assignee: SEB S.A., Selongey, France

[21] Appl. No.: 227,100

[22] PCT Filed: Apr. 30, 1980

[86] PCT No.: PCT/FR80/00068

§ 371 Date: Dec. 22, 1980

§ 102(e) Date: Dec. 22, 1980

[87] PCT Pub. No.: WO80/02496

PCT Pub. Date: Nov. 27, 1980

[30] Foreign Application Priority Data

May 11, 1979 [FR] France .................... 79 12028

[51] Int. Cl.³ ............................................ F16K 17/12
[52] U.S. Cl. .................................. 137/270; 137/516; 137/532
[58] Field of Search ............................ 220/203, 206; 137/269.5, 270, 532, 516.25, 516

[56] References Cited

U.S. PATENT DOCUMENTS 2,428,483 10/1947 Wittenberg .
2,485,380 10/1949 Hansen et al.
2,524,996 10/1950 Sayers .
2,544,186 3/1951 Sayers .
2,692,613 10/1954 Waite .

*Primary Examiner*—Alan Cohan
*Attorney, Agent, or Firm*—Young & Thompson

[57] ABSTRACT

The device comprises a steam-escape duct (1) terminated by a valve-seat (3, 4). A shut-off surface (71, 72), realized in a cap (65) at the bottom of an axial cavity (8) slidably mounted on the duct (1), rests, in the service conditions, on the seat (3, 4). The cap (65) is weighted such that its center of gravity is located below the seat (3, 4). The axial cavity (8) is connected to the outside by two eccentric vents (70) causing the cap (65) to rotate by reaction of the steam which traverses them as soon as the cooking-pressure is reached.

The device comprises an element (73) permanently attached to the cap (65) and manually displaceable between two positions each of which determines a different lifting pressure for the cap (65) in relation to the duct (1).

Use for permitting easy adaptation of the cooking pressure to the kind of food.

8 Claims, 20 Drawing Figures

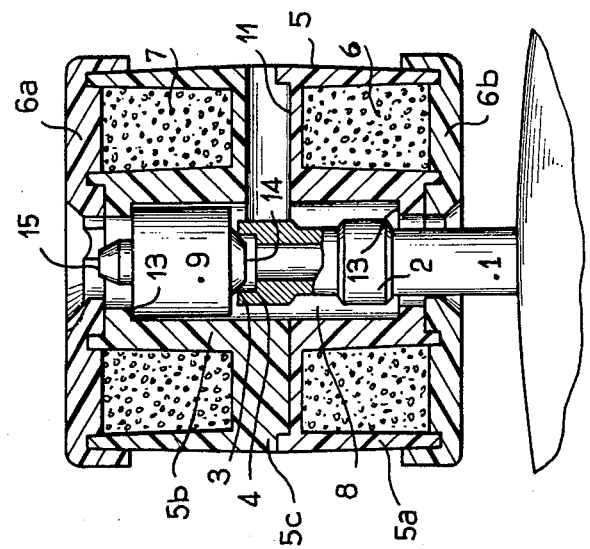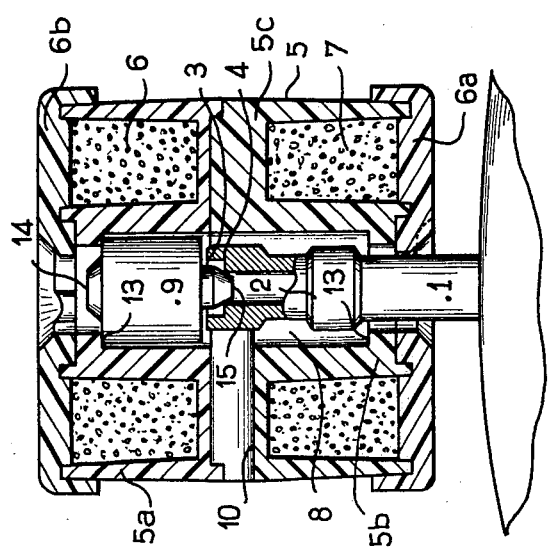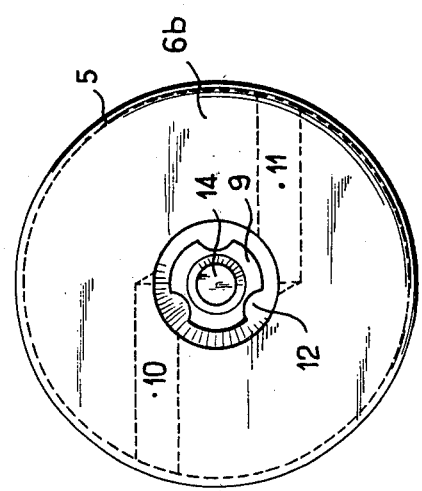

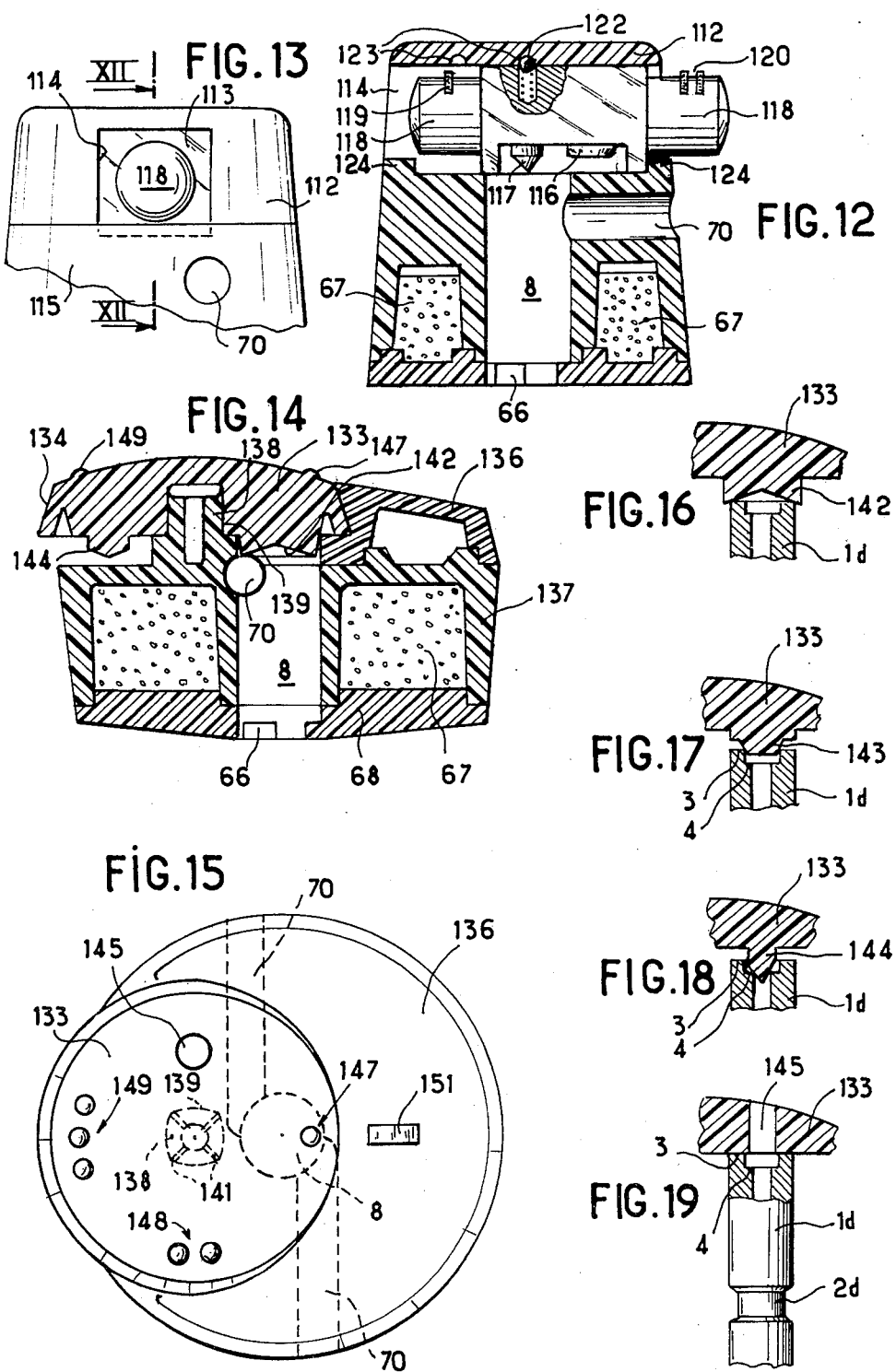

PRESSURE LIMITING DEVICE WITH TWO PRESSURE LEVELS FOR A PRESSURE COOKER

The present invention relates to a device for limiting the pressure to at least two pressure levels for a steam pressure-cooker, more particularly to a device of the type comprising a cap which starts to rotate when the level of pressure selected for cooking is reached.

In known devices of this kind, the cap, to which a valve is attached, has an axial passage, the steam escape-duct, secured to the lid of the cooker, being adapted to slide in the said axial passage when the unit is in service. The centre of gravity of the cap is located below the seat arranged around the end of the duct for accommodating the valve, and the said cap is traversed by substantially tangential, eccentric vents connecting the said axial passage to the outside of the cap. Thus, as soon as the cooking pressure is reached, the valve lifts very slightly and starts to rotates, as a result of the escape of steam through the eccentric vents. One or two detachable tubular sockets may be fitted to the cap to increase the weight thereof, thus defining different cooking-pressure levels in the cooker.

These known devices have numerous disadvantages. For instance, if the user wishes to alter the cooking pressure, he must fit or remove the sockets. These sockets may furthermore fall while the cap is being handled, causing burns if they are hot as a result of a use of the cooker. Where cooking is carried out at a low pressure, the said sockets must be stored independently of the cap. Anyway, the user comes often to loss them definitively, leaving the cooker useless for anything but low-pressure cooking.

It is the purpose of the invention to overcome these disadvantages by providing a device limiting the pressure to at least two levels, the said device being of the type having a rotating cap, in which all of the constituent elements are secured either to the lid or the cap, and permitting quite simply a change from one cooking pressure to another.

The invention therefore relates to a device for limiting the pressure to at least two levels for a steam pressure-cooker, comprising a steam-escape-duct terminating externally in a valve-seat surrounding the duct aperture, the valve adapted to bear upon the seat in order to shut off the said duct, this valve being arranged in a cap having an axial cavity adapted to accomodate the escape-duct and connected to the outside by two substantially tangential vents, the said cap being weighted in such a manner that the centre of gravity thereof, when the unit is in use, is below the said seat.

According to the invention, this device is characterized in that it comprises an element permanently attached to the cap and displaceable manually between at least two positions, each defining a different pressure at which the valve lifts in relation to the steam-escape-duct.

All that is required to alter the maximal pressure in the cooker is to move the said element from one position to another. This eliminates any complex adjustments, and the user needs not worry about detachable parts which may easily be lost.

According to certain embodiments of the invention, the different settings of the displaceable element define different sections of closure of the duct by the valve, while the said valve comprises a plurality of different shut-off surfaces designed to bear upon the seat in the various settings of the mobile element.

The two different shut-off surfaces co-operate with the seat to define two different cross-sections for the action of the steam upon the cap, the largest cross-section corresponding to the lowest cooking pressure. This eliminates the need for the detachable sockets used in the prior art.

According to other embodiments of the invention, the displaceable element is a moving weight which, in the one position, is suspended from the cap, whereas in the other position it rests upon the lid of the cooker and is thus free of the cap.

If is therefore unnecessary to remove the moving weight, even for low-pressure cooking. The device, therefore, offers two pressure levels by varying the weight, but lacks the disadvantages of the prior art.

Further features and advantages of the invention will moreover appear from the description given hereinafter. In the attached drawings, given merely as non-restrictive examples:

FIGS. 1 and 3 are axial sections of the pressure-limiting device according to a first embodiment, in its two operative positions;

FIG. 2 is a plan view of the same device, the latter being in the position shown in FIG. 1;

FIG. 12 is a sectional side elevation, along the line XII—XII in FIG. 13, of another variant of the pressure-limiting device, in the high-pressure-cooking setting;

FIG. 13 is a front elevation of the device according to FIG. 12;

FIG. 14 is a side elevation, in cross section, of a pressure-limiting device having three pressure levels, in the lowest-pressure-cooking setting;

FIG. 15 is a plan view of the device according to FIG. 14;

FIGS. 16 to 19 are details of the device in FIGS. 14 and 15, showing the end of the duct and the adjacent part of the wheel, respectively for the three cooking settings and the steam-escape setting.

Figure 4:
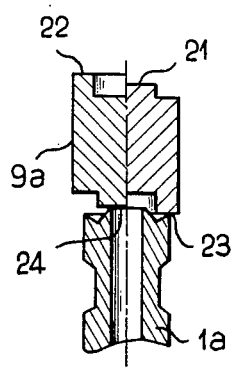
FIGS 4, 5 and 6 are axial sections of three variants of the valve in the device, and of the valve-seat.

In the design according to FIGS. 1 to 3, the pressure-limiting device comprises a steam-escape duct 1 passing through the lid of the cooker and having an intermediate boss 2, the passage therein comprising, at its upper end, a cylindrical depression forming a valve seat heating two coaxial, circular steps 3, 4. A cap 5 is adapted to slide on duct 1. This cap, made of a plastic material consists of two coaxial cylinders 5a, 5b, separated by a central partition 5c, and of two end-covers 6a, 6b, each having a central aperture. All this define two annular chambers 6, 7 filled with shot of lead or of some other heavy metal.

Cap 5 has an axial cavity 8 terminating at its ends in internal shoulders 13 constituting stops, and in which a valve 9 is slidably amounted. This valve 9 has a cylindrical body carrying at its ends truncated-conical needles 14 and 15 of different average diameters. Valve 9, constituting the displaceable element in the device, may assume two positions, passing from one to the other by simple turning over. FIG 1 shows that with valve 9 in its first position, needle 15, which has the smallest average diameter, enters fully into external step 3 in the valve-seat and bears upon internal step 4, which is narrower, of the valve-seat. Under these conditions, the weight of cap 5 tends to maintain the valve on its seat against the steam pressure. The lifting force exerted by steam pressure is proportional to the area, as projected onto a plane at right angles to the direction of movement of the valve, i.e. a horizontal plane in the example illustrated, of the part of needle 15 circumscribed by seat 4 and which is exposed to the steam pressure. The diameter of step 4 of the seat is such that the lifting force exerted by the pressure of steam lifts and valve as soon as this pressure reaches 1,9 bar. At this moment, the steam lifts the valve, with cap 5, and escapes through two horizontal vents 10, 11 pierced in the central partition of cap 5. These vents thanks to their eccentric position, cause the cap to rotate by reaction to the pressure exerted by the steam.

Cap 5 may be removed from escape-duct 1 and replaced upside-down, as shown in FIG. 3. At this time, valve 9, which has thus been rotated to its other position, slides from one end to the other of axial cavity 8 in cap 5, and comes up against shoulder 13 which partly closes the other end of the said cavity. Thus the centre of gravity of cap 5 is at all times below the level of valve-seat 3, 4, and the cap is therefore always in stable equilibrium. In the position shown in FIG. 3, wide needle 14 of valve 9 bears upon external step 3, which is also wider, of the valve-seat. In this position, the area, as projected onto a horizontal plane, of the part of needle 14 exposed to the steam pressure, is larger than in the position shown in FIG. 1, so that the lifting force balancing the weight of cap 5 and valve 9 is obtained with a steam-pressure of only 1, 5 bar. As soon as this pressure is exceeded, than valve 9 lifts and the steam escapes through vents 10, 11, as in the first position.

The central apertures in covers 6a, 6b, in cap 5 are each equipped with three resilient pojections 12, visible in FIG. 2, which, in co-operation with boss 2 in duct 1, allow the pressure-limiter to be placed manually, in a manner known per se, in a position allowing the escape of steam.

In FIG. 4, valve 9a is shown in the high-pressure setting to the left of the axis and in the low-pressure setting to the right. The change-over from one position ot the other is obtained by inverting cap 5, as in FIGS. 1 and 3. The two shut-off surfaces 21, 22 of valve 9a are flat and at right angles to the axis, whereas the valve-seat in escape-duct 1a consists of two edges 23, 24 projecting axially towards the valve. In the high-pressure setting valve 9a rests by, its circular surface 21, upon internal edge 24 of the seat. In the low-pressure setting, annular surface 22 of the valve rests, by its annular surface 22, upon external edge 23 of the valve-seat. It will be seen that, in the low-pressure setting, the area, as projected onto a plane at right angles to the axis, of the part of the valve exposed to the pressure is larger than in the high-pressure setting.

Figure 5:
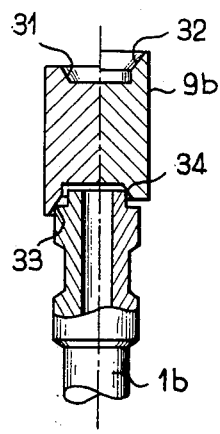

The varient in FIG. 5 is the reciprocal of the arrangement in FIGS. 1 to 3, in that circular steps 33, 34 of the seat are arranged externally of duct 1b, and in that ends of valve 9b have truncated conical depressions 31, 32 having different average diameters. Valve 9a is shown in the high-pressure setting to the right of the axis and in the low-pressure setting to the left. It will be seen that in this latter setting, in which valve 9b rests upon the edge of large step 33, the area, as projected onto a plane at right angles to the axis, of the part of valve 9b exposed to the pressure is larger than in the high-pressure setting. Here again, movement from one setting to the other is by inverting the cap.

Figure 6:
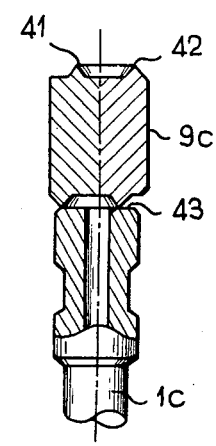

In FIG. 6, the high and low-pressure settings of valve 9c are shown as in FIGS 4 and 5. The two closure surfaces of the valve are defined by circular edges 41, 42 projecting axially. Depending upon the position of valve 9c, one or the other of these edges rests upon a flat seat 43 at right angles to the axis of duct 1c. The area, as projected at right angles to the axis, of the part of the valve exposed to the pressure is obviously larger when edge 42 rests upon the seat than when edge 41 so rests.

Figures 7, 8:
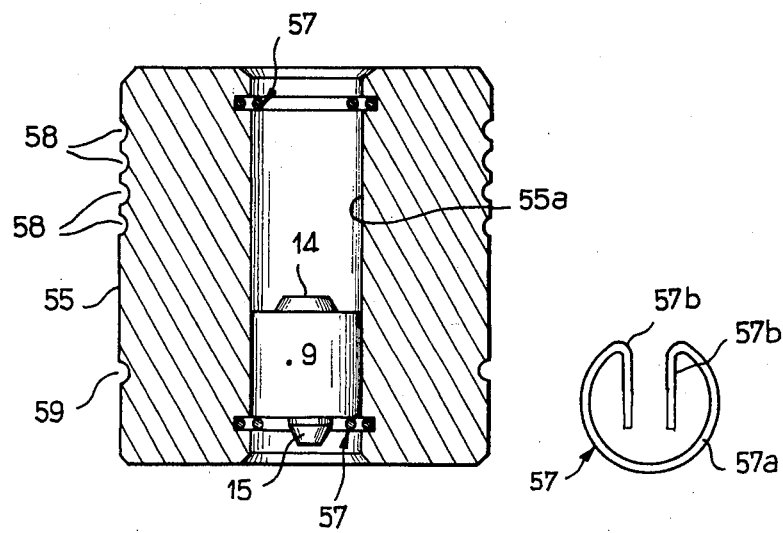
FIG. 7 is a partial view, in axial section, of another embodiment of the cap and of the valve of the pressure-limiting device.
FIG. 8 is a plan view of one of the valve-stops in the device according to FIG. 7.

In the example of embodiment according to FIG. 7, wherein the steam-escape duct and the valve-seat (not shown) are similar to those in the first example of embodiment, cap 55 is a single piece of metal. The stops in the sliding bore 55a in valve 9 are no longer in the form of shoulders, but are resilient spring-steel-wire parts 57 comprising a curved central portion 55a (FIG. 8) held by compression in an annular groove in axial bore 55a of cap 55, and two straight, parallel end-sections 57b which transmit the thrust applied by the cap to the valve, and which, being detachable, permit the valve to be inserted into the bore.

Cap 55 is equipped with a group of four peripheral grooves 58 in the vicinity of its end which is the upper end in the high-pressure setting (as shown), and with a single peripheral groove 59 in the vicinity of its end which is the upper end in the low-pressure setting. These grooves make it possible to identify the valve setting and, therefore, the opening-pressure of the valve.

In the design according to FIG. 9, the pressure-limiting device comprises an escape-duct 1 identical with that described in connection with FIGS. 1 to 3.

As in these preceding designs, the device also comprises a cap 65 having a cylindrical axial cavity 8 in which duct 1 slides when the unit is in service. At the end which opens into the cooker, cavity 8 is equipped with three resilient stops 66 designed to cooperate with boss 2 in duct 1, in order to prevent the cap from falling when the lid of the cooker is inverted, and to make it possible to set the said cap in a raised position allowing free escape of the steam when the cooking is completed.

An annular chamber 67 filled with a load of lead-shot is arranged around cavity 8 and is closed off by a cap 68 welded to cap 65, for example utrasonically, thus constituting the base of the said cap. The location of chamber 67 containing the weight ensures that the centre of gravity of the cap is located below the valve-seat consisting of steps 3 and 4 in duct 1. With the exception of the weight and duct 1, the entire device is made of plastic.

The upper part of cavity 8 is connected to the outside by two opposing eccentric vents 70 pierced in cap 65 tangentially of cavity 8, above annular chamber 67.

The device comprises two shut-off surfaces 71, 72 having the same axial conicity as cavity 8.

Shut-off surface 71, which surrounds the other has a truncated cone arranged in the mass of cap 65. The dimensions of surface 71 are such as to allow it to rest upon the lower edge of upper step 3, which is the wider.

Shut-off surface 72, on the other hand, is located at the conical end of an element 73 displaceable along the axis of cap 65, by screwing in a boss 74 constituting the upper part of cap 65.

Element 73 is adapted to move between two extreme positions, one in which surface 72 is retracted into cap 65 and allows surface 71 to rest upon step 3, the other in which it projects into axial cavity 8 and, bearing in mind that it is smaller in diameter than step 3 but larger in diameter than the internal edge of step 4, rests upon this edge of step 4, without surface 71 coming into contact with step 3.

Displaceable element 73 is integral with a rotary control button mounted on top of cap 65, and comprising a skirt 77 which surrounds boss 74 and comes to a stop against the body of cap 65 in the projecting position of surface 72. Skirt 77 has projections 78 engaging under an end-collar 79 on boss 74 and bearing thereagainst when surface 72 is retracted. These projections 78, which also prevent accidental dismantling of movable element 73, are produced, during moulding, with the aid of detachable plugs fitted in openings 76a in the shell of button 76.

Between its threaded part and button 76, displaceable element 73 has an expanded part 81 adapted to slide in boss 74 above a shoulder 83 forming, for part 81, a step which, like the bottom of skirt 77, limits the extension of shut-off surface 72 in axial cavity 8 of cap 65. A toroidal seal 82 is mounted with boss 74 around the expanded part 81 of moving element 73.

This device operates as follows:

When surface 72 is extended into axial cavity 8, the shut-off section of duct 1 is defined by the internal edge of lower step 4. When the cooking pressure reaches 1,9 bar, it overcomes the weight applied to surface 72 and the cap lifts slightly and starts to rotate.

If surface 72 is retracted by rotating control-button 76 until projections 78 come to a stop against collar 79, surface 71 bears upon upper step 3. When the unit is in use, seal 82 prevents any escape of steam between cap 65 and moving element 73. Bearing in mind the larger shut-off section defined by the internal edge of step 3, lifting of the cap occurs as soon as the cooking pressure reaches 1, 5 bars.

Figure 9:
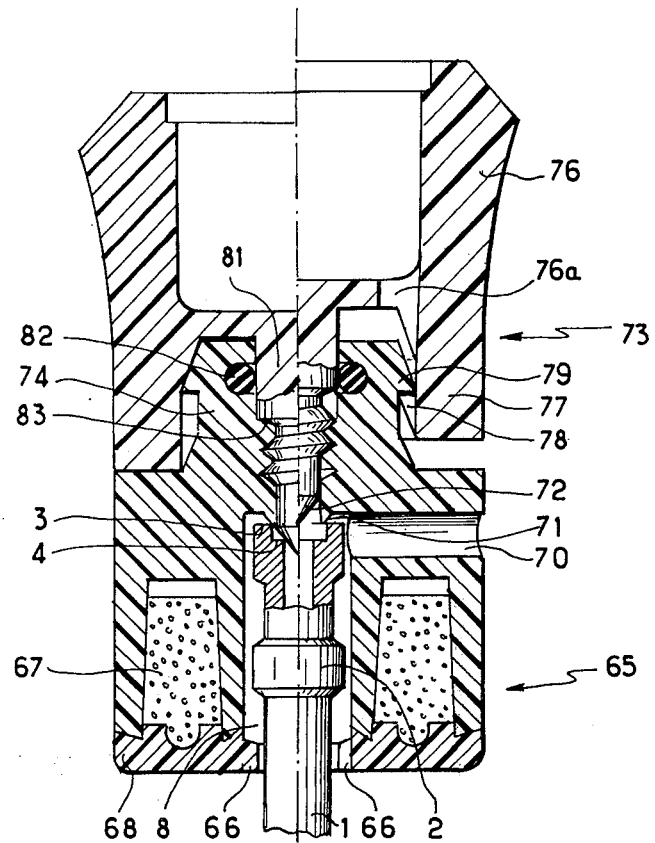
FIG. 9 is a cross section of another pressure-limiting device, in the high-pressure-cooking setting on the left hand side, and in the low-pressure-cooking setting on the right-hand side of the section.

In the designs according to FIGS. 10 to 18, escape duct 1, and the lower part of the cap, including axial cavity 8, annular chamber 67, and eccentric vents 70 are similar to those of the design according to FIG. 9 and will not be described further, except to point out the differences between the designs.

Figure 10:
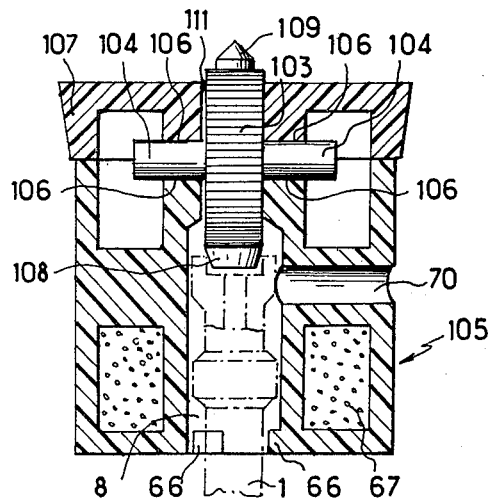
FIG. 10 is a cross-section of another embodiment of the device, in the low-pressure-cooking setting.
Figure 11:
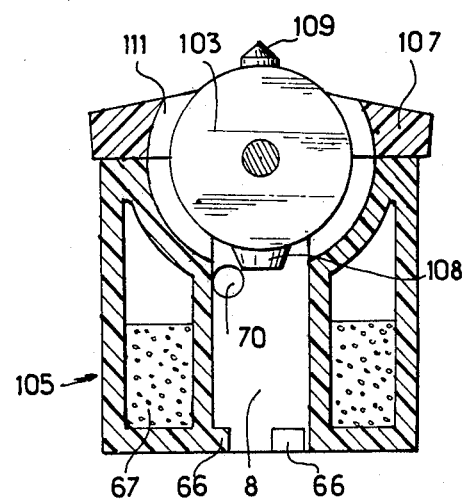
FIG. 11 is a section along the line XI—XI in FIG. 10.

In the device illustrated in FIGS. 10 and 11, displaceable element 103 is a knurled wheel adapted to rotate, in relation to cap 105, about an axis at right-angles to cavity 8, on two opposing axial trunnions 104 engaged between complementary recesses 106, in the upper part of the actual cap, and in the base of a cover 107 welded ultrasonically to the top of cap 105.

Rigidly attached to wheel 103, at various locations around the periphery thereof, are for example two shut-off cones 108, 109 of different largest diameters, one being able to co-operate with step 3 and the other with step 4 in duct 1.

One part of the periphery of wheel 103 is permanently located at the bottom of axial cavity 8, whereas the diametrically opposite part appears externally through a rectangular opening 111 on cover 107. The said wheel is adapted to rotate between two positions, one in which large shut-off cone 108 is at the bottom of cavity 8, whereas cone 109 projects from cover 107, and the other in which the set-up is reversed.

The top of cap 105 and cover 107 define an annular cavity, the purpose of which is to reduce the height of the cap and to lower the centre of gravity thereof. Furthermore, the periphery of wheel 103 is serrated transversely, to facilitate operation by the user. Means, not shown, are provided to lock wheel 103 in one or the other of the two positions.

The user may choose between two pressure levels for cooking merely by rotating wheel 103 between its two operative positions. Depending upon which of the two cones 108, 109 appears in opening 111, the operator is aware of the pressure selected for cooking.

In the design according to FIGS. 12 and 13, the displaceable element is a slide 113 mounted in a passage 114 traversing the upper part of cap 115 above vents 70. Passage 114 which, like slide 113, is of square cross-section, is at right angles to axial cavity 8 and communicates therewith. In the example illustrated, the two lateral surfaces, and the upper surface, of passage 114 are contained in a cover 112 welded to the top of the actual cap 115.

Except for its two ends, the surface of slide 113 facing axial cavity 8 carries two shut-off cones 116, 117 similar to cones 108, 109 in FIGS. 10 and 11 and arranged side by side. This surface of slide 113 is relieved around cones 116, 117, so that the latter do not rub against the wall of passage 114.

Slide 113 is adapted to move between two positions in each of which one of cones 116, 117 is located at the bottom, and in the axis of, axial cavity 8 in cap 115.

Slide 113 terminates at its both ends in two buttons 118 which project alternately from cap 115, depending upon the position of slide 113, and carry references 119, 120 which indicate the pressure selected for cooking, when corresponding button 118 is visible.

Moreover, a small, blind, transverse hole 121, arranged in the surface of slide 113 facing cavity 8, contains a spring-loaded locking ball 122.

The corresponding surface of passage 114 has two depressions 123, in one or the other of which ball 122 engages when slide 113 occupies one of the two aforesaid positions.

Furthermore, the ends of the lower surface of passage 114 carry two stops 124 preventing accidental dismantling of slide 113.

In this design, the user changes from one cooking pressure to the other by manually pushing, into passage 114, the button 118 initially projecting therefrom. This causes one or the other of cones 116, 117 to co-operate with the valve-seat in duct 1.

In the example illustrated in FIGS. 14 to 19, duct 1b has no intermediate boss, but has a grove 2d in which, when the unit is in service, stops 66 are pemanently, but releasably, engaged in order to prevent accidental falling of the cap, the free escape of steam being rendered possible by other means set forth hereinafter.

The device comprises a knurled wheel 133, the axis of which is parallel with, but offset in relation to, the axis of cavity 8. Wheel 133, which is the manually displaceable element of the device, has a conical circumference 134 widening out towards the cooker and engaging in an opening of corresponding conicity in crescent-shaped cover 136, which is substantially welded ultraconically to the top of cap 137.

The axis of rotation of wheel 133 is in the form of a tenon 138 on the upper surface of cap 137 engaging in a corresponding blind hole 139 in wheel 133.

Since it is simultaneously a taper fit in cover 136 and engaged with tenon 138, the said wheel is secured to cap 137.

Tenon 138 and hole 139 are of slightly squared cross-section (FIG. 15), tenon 138 being tubular and having four longitudinal slots 141 imparting thereto a certain amount of radial resiliency.

The lower surface of wheel 133 carries four devices at 90° to each other which may extend alternately to the bottom of axial cavity 8.

Three of these devices are shut-off surfaces 142, 143, 144, whereas the fourth is an unobstructed escape hole passing through wheel 133.

Surfaces 143 and 144 are identical with cones 108, 109 in FIG. 10, whereas surface 142 is a conical depression designed to bear upon the outer edge of upper step 3 in duct 1.

Wheel 133 may assume four positions, in each of which one of devices 142 to 145 is opposite axial cavity 8 in cap 137.

References 147, 148, 149, visible on the upper surface of wheel 133, face a reference 151 on cover 136 when one of the shut-off surfaces, which they identify, is in use. Escape hole 145 itself faces reference 151 when it is in alignment with cavity 8.

In each of these positions, the slightly squared cross-sections of tenon 138 and cavity 139 are in concordance and ensure locking in these positions.

When wheel 133 is rotated from one position to another, tenon 138 contracts by narrowing of its longitudinal slots 141; it then expands again when another device 142, ... or 145 is at the bottom of cavity 8, thus locking wheel 133 in this position.

Shut-off surface 142, when at the bottom of axial cavity 8, permits cooking under very low pressure, in view of the substantial shut-off section thus obtained at the end of duct 1. Furthermore, hole 145 ensures unobstructed escape of the steam in the cooker when it is in alignment with cavity 8.

Figure 20:
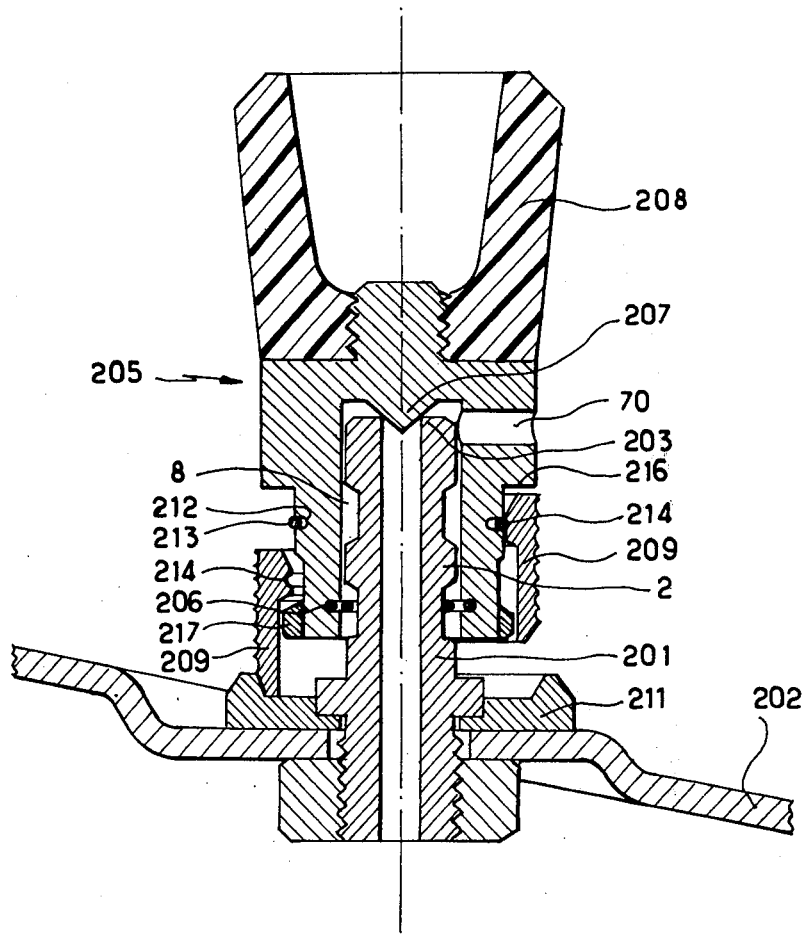
FIG. 20 is a side elevation, in cross section, of a device which limits the pressure to two levels, adjustable by varying the weight.

In the example illustrated in FIG. 20, steam-escape duct 201, secured to lid 202 of the cooker, resembles duct 1 in the designs according to FIGS. 9 to 13, except that its terminal seat 203 is single instead of having steps.

As in the previous designs, cap 205 has an axial cavity 8 in which duct 201 slides, and which is connected to the outside by eccentric vents 70.

Cap 205 is made of metal and carries, at the bottom of cavity 8, a steel-wire part 206 similar to part 57 in FIG. 8. Part 206 is designed to co-operate with boss 2, to prevent cap 205 from falling when lid 202 is inverted or to provide a raised, free-escape position for steam when cooking is completed.

At the bottom of cavity 8, a shut-off cone 207 is provided in the mass of cap 205, the said cone co-operating with seat 203.

Moreover, a plastic hood 208 is screwed to the top of cap 205 to provide a satisfactory grip.

In this design, the manually displaceable element is a mobile tubular weight 209 fitted to the base of cap 205.

Weight 209 is adapted to move between a position in which it is suspended from cap 205 (right-hand side of FIG. 20) and a position in which it rests upon cover 202 (left-hand side of FIG. 20) and is thus free in relation to the cap.

A cup 211, secured to cover 202 around duct 1, accommodates weight 209 when the latter is resting upon cover 202, thus accurately centering the said weight in relation to cap 205, so that the latter may rotate, without rubbing against the said weight, as soon as the cooking pressure is reached.

Cap 205 has a groove 212 accommodating a radially resilient, corrugated ring designed to engage releasably in an annular groove 214 arranged in a constricted part of weight 209, allowing the said weight to be secured to the said cap at will.

Above groove 212, cap 205 has a shoulder 216 which limits the ascent of weight 209 towards hood 208, thus facilitating its engagement with resilient ring 213.

A ring 217, fitted to the base of cap 205, co-operates with the constricted part of weight 209 to prevent accidental removal of the said weight.

The weight 209 being suspended from cap 205 by ring 213, the said cap lifts and starts to rotate when the cooking pressure reaches 1,9 bar.

If the user releases weight 209 from ring 213 and thus allows it to rest in cup 211, cap 205, which is now lighter, starts to rotate as soon as the pressure reaches 1, 5 bar.

The foregoing description indicates that the proposed designs are characterized in that they are very easy to operate and that there is no risk of losing any component in the cap.

The various designs are also very simple to manufacture and most of them are nearly entirely made of plastic.

It is to be understood that the invention is not restricted to the examples of embodiment described herein before, and that numerous modifications may be applied thereto, without departing from the framework thereof.

For example, in a simplified design of the type of those illustrated in FIGS. 1 to 8, valve 9 may be stationary.

In order to lower the centre of gravity of cap 5 in its two positions, the interior thereof may be partly filled with a liquid or with granules of high-density material, and communication may be arranged between the upper and lower parts of the said cap.

Furthermore, the visual cooking-pressure references, provided in some of the designs, may be replaced with other references, i.e. by colours, signs, or numbers indicating the relevant temperatures.

The means for locking the manually displaceable element in its operative positions may be modified or changed from one version to another, although in this case, as in others, the designs shown have many advantages.

I claim:

1. A device for limiting the pressure to at least two pressure levels for a steam pressure-cooker, the said device comprising a steam escape duct terminating externally in a valve seat surrounding the duct opening, a cap which has an axial cavity adapted to accommodate the escape duct and connected to the outside by two substantially tangential vents, wherein the cap is adapted to slide upon the steam escape duct and may be at will turned over with respect to the steam escape duct, and a valve slidable in the axial cavity and provided at its ends with coaxial differently designed shut-off surfaces adapted to bear upon the seat in order to shut off the duct with different shut-off cross sections, the cap comprising, at each end, stops designed to apply the weight of the cap to the shut-off surface in such a manner that the center of gravity of the cap is located below the contact between the shut-off surface and the seat thereof.

2. A device according to claim 1, characterized in that the cap (55) is a single piece of metal comprising an axial bore (55a), and in that each of the stops is in the form of a detachable, resilient metal wire (57), one part of which engages in a circular groove in the bore while the other part projects into the interior of the bore (55a).

3. A device according to claim 1, characterized in that the cap (5, 65, 105, 115, 137) is in the form of a plastic casing defining at least one chamber (6, 7, 67) containing high-density material.

4. A device according to claim 3, wherein the cap consists of two axial cylinders separated by a central partition and of two end covers each having a central aperture, the vents being pierced in the central partition.

5. A device according to one of claims 2, 3, 4 or 1, characterized in that the shut-off surfaces (14, 15, 71, 72, 108, 109, 116, 117, 143, 144) are conical and differ by their large diameter and in that the seat (3, 4) is stepped, the large diameter of one of the shut-off surfaces (14, 71, 108, 116, 143) being greater, and that of the other shut-off surface (15, 72, 109, 117, 144) being less, than the diameter of the wider step (3).

6. A device according to one of claims 2, 3, 4 or 1, wherein the valve seat of the escape duct consists of an internal edge and an external edge both projecting towards the valve, each edge being intended to engage a respective shut-off surface of the valve.

7. A device according to one of claims 2, 3, 4 or 1 wherein the seat has circular steps arranged externally of the steam escape duct while the shut-off surfaces of the valve are conical depressions having different average diameters.

8. A device according to one of claims 2, 3, 4 or 1 wherein the seat has a flat surface while the shut-off surfaces of the valve are defined by circular projecting edges of different diameters.

* * * * *